United States Patent Office 3,264,890
Patented August 9, 1966

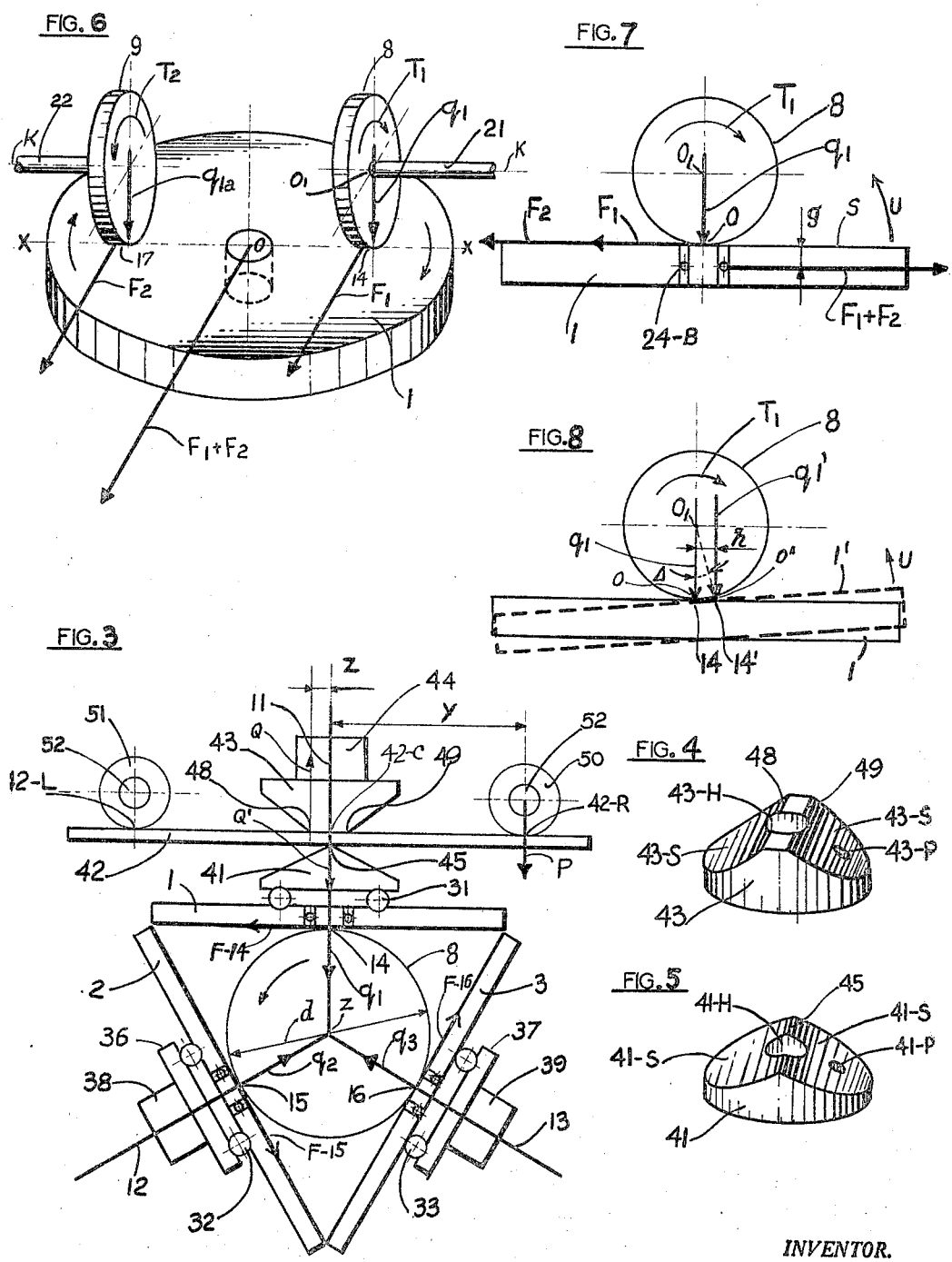

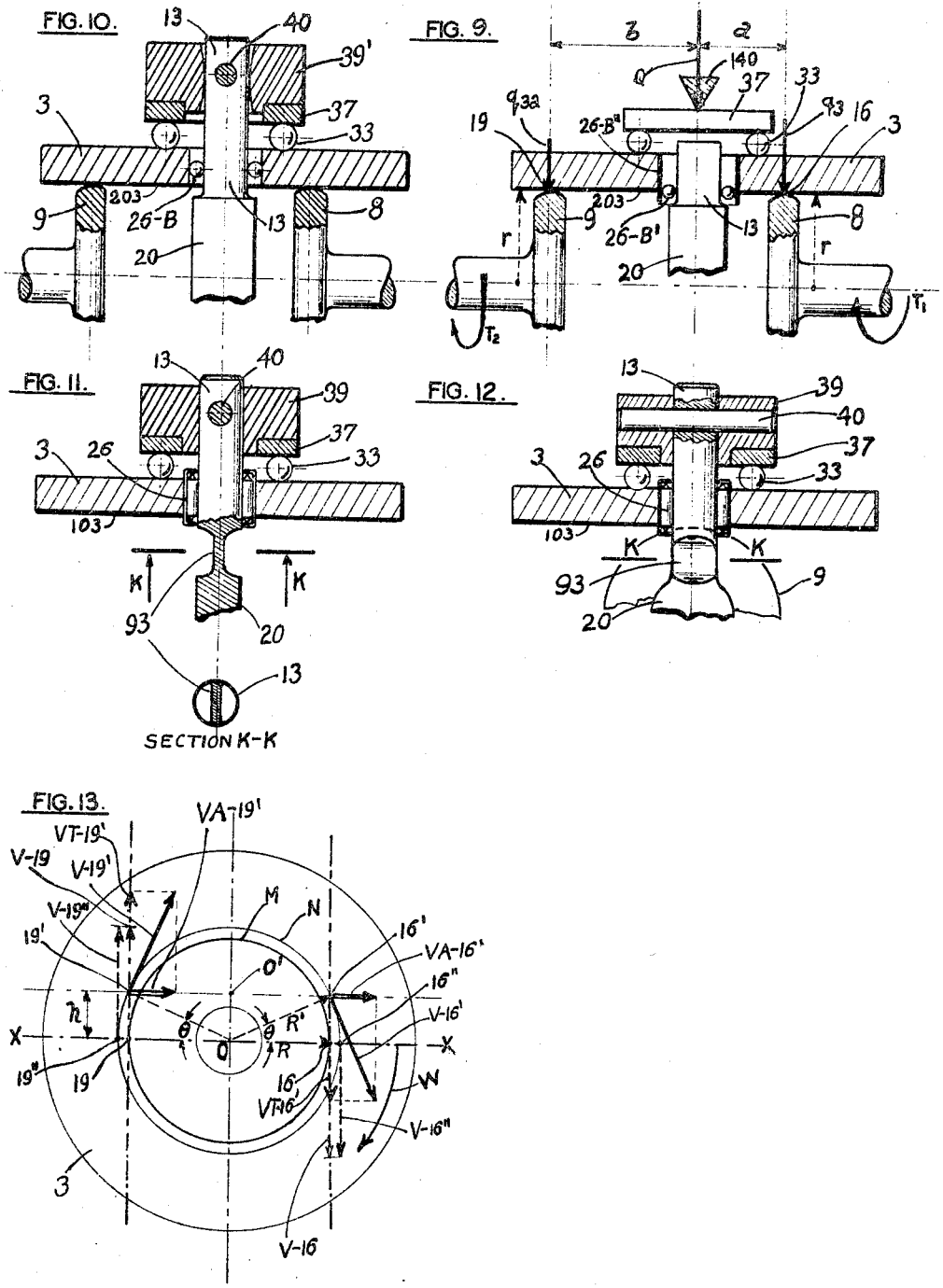

3,264,890
VARIABLE SPEED TRANSMISSION
Richard T. Erban, 145—38 Bayside Ave., Flushing, N.Y.
Filed Nov. 28, 1960, Ser. No. 72,193
15 Claims. (Cl. 74—196)

This invention relates to variable speed transmissions in which the torque is transmitted from one shaft to the other by the tractive forces developed in the rolling contact between so-called friction rollers and discs having their respective planes of rotation at substantially right angles to each other. While the transmission hereinafter described may in one of its aspects seem to resemble a type of transmission shown in my earlier U.S. Patent 2,057,482, and some other known friction transmission devices, it distinguishes from all such previous devices by incorporating structures which are based on new concepts of the operational function of the transmission system under transient load conditions; these new structures which embody new principles endow the transmission system with specific operational properties which are not found in any previous transmission of this kind.

One of these specific properties is concerned with the rate of response of the transmission system to transient loads and velocity conditions. The importance of this rate of response for the attainment of a high degree of reliability of operation together with a high efficiency of power transmission has heretofore not been recognized; in one of its particular aspects, the dynamic effects of transient loads upon the operation of the individual transmission elements and the modification of these effects due to the interplay between the effective inertia and the rotational complience of the system were not considered at all and therefore no structural means were provided for preventing the adverse effects of such load conditions.

Extensive tests have shown that as a result of such neglect the operation of previous systems was either unreliable under transient conditions, or such transmissions lost 20 to 40% of the power; in other applications, automatic speed control systems showed malfunction caused by unexplained power feed-back under transient load conditions.

The invention which is disclosed in the following specification and illustrated in the accompanying drawings is the result of extensive experiments that lead to new concepts of the functioning of some elements of the transmission; on the basis of these concepts, new structures were developed as herein described, which have experimentally proven to modify the dynamic response of the transmission system to such extent that the adverse effects of transient load conditions can be eliminated.

Another object of the invention is to provide a structure for a variable speed transmission which is simple and of rugged design, which can be manufactured at moderate cost and which, for the purpose of economical servicing and maintenance, can be easily disassembled and reassembled.

In the accompanying drawings which illustrate the invention by way of example,

FIG. 3 illustrates schematically the relative position of the transmitted forces and of the required contact pressures together with the critical dimensions of certain elements of the system automatically controlling the contact pressure.

FIGS. 4 and 5 are perspective views respectively of the two cam elements of the pressure control system.

FIG. 6 is a perspective schematic view of the basic transmission elements and illustrates the transmitted peripheral (or tangential) forces, the contact pressures and the resultants of these forces.

FIG. 7 is a schematic view of the elements of FIG. 6 as seen from the right hand side looking in the direction of the shaft 21.

FIG. 8 is a schematic view similar to FIG. 7 and illustrates one of the effects of transient load change upon the elements of the transmission.

FIG. 9 illustrates schematically the required relationship between transmission ratio, tangential forces and contact pressures, and shows a basic arrangement of means for satisfying these requirements.

FIG. 10 illustrates a structure providing a practical solution to fulfill the requirements illustrated in FIG. 9.

FIGS. 11 and 12 show in elevation and cross-sectional view respectively another structure which assures that the requirements illustrated in FIG. 9 are fully met.

FIG. 13 is a diagram illustrating the effects of the load response referred to in FIG. 8 upon the efficiency of power transmission and it further shows the cause of the feed-back effect upon the ratio control system.

Referring again to FIGS. 1 and 2, there are two shafts, 21 and 22 respectively, in axial alignment; either of these shafts can be input or output shaft. Each of these shafts is rigidly supported for free rotation by a double-row, pre-loaded ball bearing, 71 and 72 respectively.

Figure 1:
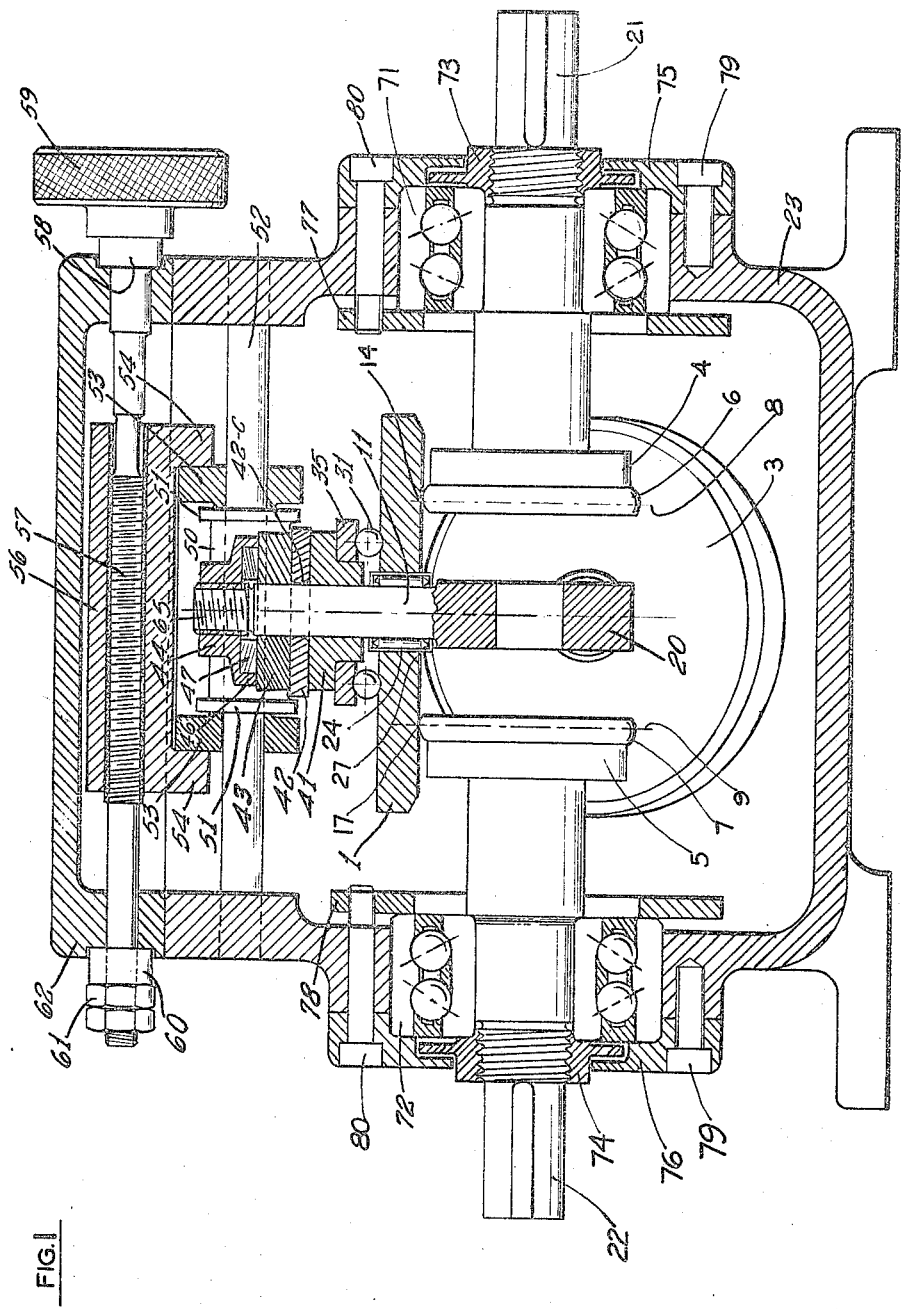
FIGS. 1 and 2 show a longitudinal section and cross section respectively.
Figure 2:
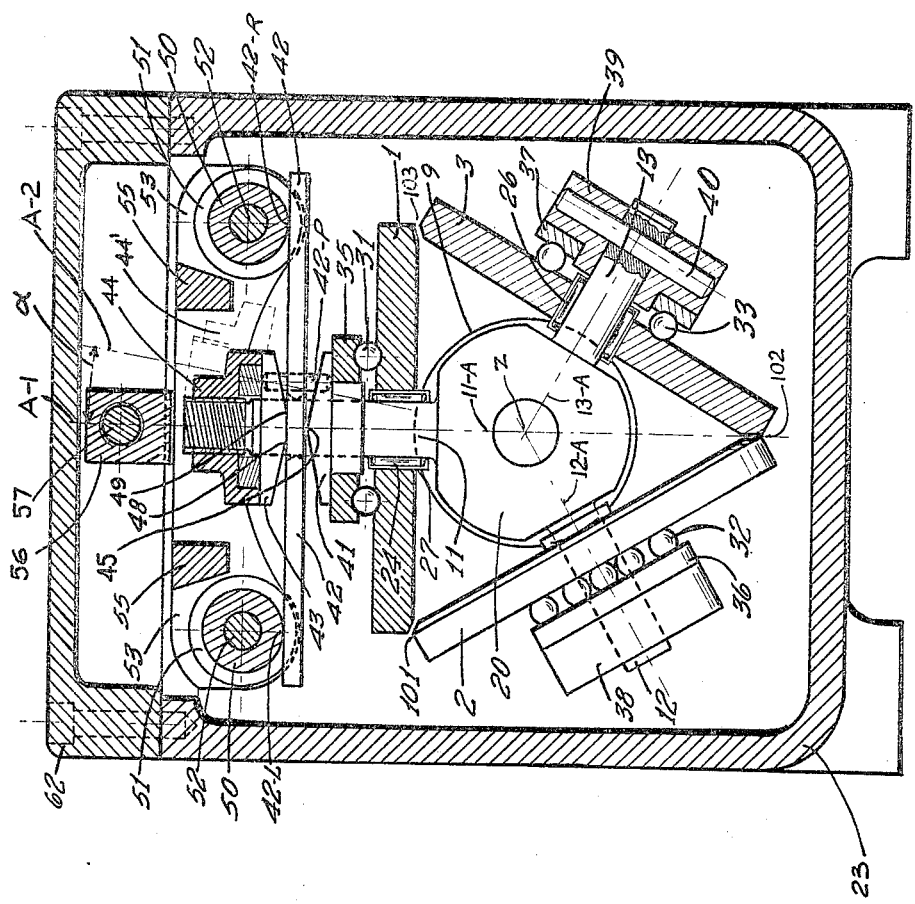

The shaft 21 carries on its other end, which protrudes into the housing 23, a roller or disc 4. A portion of this roller 4 is provided with a slightly convex profile 6, which has its greatest diameter in the plane of rotation 8. A cross-section through the roller 4 along the plane 8 will therefore show the greatest diameter of the profile surface 6 of the roller 4. In a similar way, the shaft 22 carries on its other end the roller 5 which has a profile surface 7 and a plane of greatest cross section 9. The two axially aligned rollers, 4 and 5 respectively, are surrounded by three flat discs, 1, 2 and 3 respectively. The planes of the disc surfaces are inclined at 60° with respect to each other, and they are substantially parallel to the geometrical axis of the two rollers 4 and 5. It is therefore clear that the profiles 6 and 7 respectively, must contact the three discs 1, 2 and 3 in points positioned for each of the rollers in the circle marking the intersection of the plane 8 with each of the planes of the surfaces of disc 1, 2, 3, for the roller 4, and upon the circle marking the intersection of the plane 9 with the discs for the roller 5, respectively. Therefore, the greatest circle of the profile of each roller has been given the same reference number as the plane intersecting the profile surface at its greatest diameter. These circles 8 and 9 respectively, are then also the tracks denoting the path of the rolling contact upon the rollers. In FIG. 1, only the contacts between the rollers 4, 5 and the disc 1 are seen, and marked 14 for the roller 4 and 17 for the roller 5. The contact points between the rollers and the other two discs, 2 and 3 respectively cannot be seen in FIG. 1. In FIG. 2, the roller 4 is not seen, and the roller 5 is seen as a circle of its largest diameter 9.

The bearing 71 which holds the shaft 21 is clamped between the cover 75 and the inner clamp ring 77 by three bolts 80 while the cover 75 is fastened to the housing 23 by three screws 79. The shaft 22 with its bearing 72 is held in a similar way between the cover 76 and the clamp ring 78, and fastened similarly by the screws 80 and 79 respectively. It is clear that the bores in the housing which hold the outer races of the bearings 71 and 72 respectively, form part of one and the same cylindrical surface and can be produced by line-boring in a simple manner to assure perfect co-axial positioning of the two shafts, 21 and 22 respectively, and therefore likewise of the two roller tracks, 8 and 9 respectively. The contact points between the disc 1 and the two rollers, 4 and 5 respectively, have been numbered 14 and 17 respectively. The contact between roller 4 and disc 2 is denoted 15, and between roller 4 and disc 3 is 16. Both of these are not visible in FIGS. 1 and 2, but are used in later figures. The above stipulated condition of a high degree of accuracy of axial alignment is of great importance, because otherwise the radii from each of the three contact points 14, 15 and 16 to the geometrical axis of its respective disc (that is, 1 for contact 14, 2 for contact 15 and 3 for contact 16) would not be the same, and therefore each of the three discs (1, 2 and 3) would be driven by the track 8 at a different speed. A similar condition would prevail between the roller 5, track 9, and the three discs (1, 2, 3). Since the output shaft 22 can rotate only at one speed, it is clear that the speed differences between the discs can be equalized only by slippage in the contacts, leading to excessive heat, low efficiency and increased wear, all of which must be avoided.

The disc 1 is journalled upon the radial shaft 11 by the roller or needle bearing 24. A ball thrust bearing 31–35 transmits axial pressure from a sliding member 41 to the disc 1. The other discs, 2 and 3 respectively, are likewise rotatable upon radial shafts, 12 and 13, by means of needle bearings 25 (not shown) and 26, as may be seen in FIG. 2. Disc 3 is shown to be backed by a ball thrust bearing 33 with race 37, which in turn is supported by the abutment ring 39. This ring 39 is held against axial motion by the pin 40. The disc 2 is supported in identical manner, but the elements are shown in view rather than in section in FIG. 2.

It is seen that the three radial shafts, 11, 12 and 13, are united by a common carrier or hub 20, and that this hub 20 is positioned free floating between the three discs 1, 2, and 3. It is noted that the spacing of the discs with their thrust bearings upon the radial shafts is such, that the intersection point of the three geometrical axes of the radial shafts, 11–A, 12–A, and 13–A, coincides with the geometrical axis of the shafts 21, 22 and the roller tracks 8 and 9 respectively, which is at the point Z (FIG. 2). In order to accomplish this, it is necessary that the geometrical axes 11–A, 12–A, 13–A are positioned within one and the same plane and that they intersect each other in one point. The relative distance of each of the discs, 2 and 3 respectively, from the common center point Z, can then be adjusted by placing shims of predetermined thickness between the thrust bearing races, 36 and 37 respectively, and the abutment rings 38 and 39 respectively. The aforesaid conditions must be met in order to assure that the contact between each roller and the discs is a pure rolling contact without lateral forces that cause a precessional motion of the rollers relative to the discs, as will be later more fully explained.

In FIG. 2 it can be seen that the sliding member 41 has a wedge shaped upper surface culminating in a crest 45, which is shown in perspective view in FIG. 5. The two slanting surfaces 41–S are inclined with respect to the flat base at the same angle of about 10°, so that the angle at the crest line 45 is substantially 160°. It is noted however that the absolute size of this angle is not a critical value as long as it provides sufficient clearance for the lever-plate 42 to oscillate like the beam of a balance to both sides of its neutral position which is perpendicular to the shaft 11, as shown in FIG. 2. The lever plate 42 has a hole slightly larger than the diameter of the shaft 11 and chamfered edges on both sides to permit such oscillating motion of the lever plate within a predetermined limit; in the transmission illustrated, this is about 10° of amplitude to both sides of its neutral position.

The upper surface of the lever-plate 42 makes contact with a member 43, which has a shape somewhat similar to the part 41, except that it has a small flat strip parallel to its base surface instead of a sharp crest line. In FIG. 4 this part is shown in a perspective view in a position which is upside-down with respect to the position shown in FIG. 2, as is easily understood by comparing the two figures. The angles of the slanted surfaces 43–S are the same as the angles of the faces 41–S in FIG. 5. The distance between the two crest-lines, 48 and 49, which determines the width of the small strip, is an important and critical dimension and will be explained in detail in connection with FIG. 3. The bore, or hole, 43–H is closely fitting upon the shaft 11, while the hole 41–H of the part 41 is providing a free sliding fit upon the shaft 11. The holes 41–P and 43–P respectively are provided to hold the crest line 45 parallel to the edges 48 and 49 by means of a pin 42–P which is located in a small hole in the lever plate 42 and slidingly engages the hole 41–P in the element 41 below the lever plate 42 and the hole 43–P in the element 43 above the lever plate 42. The upper element 43 is held tightly against the lever plate 42 by the adjustable nut 44, positioned on the threaded portion 65 of the shaft 11. The nut 44 bears against the element 43 with the rim portion 46 (FIG. 1) directly, and indirectly through the bevel disc springs 47. In order to make the spring force effective in securing at all times a driving contact between the discs 1, 2 and 3, and the rollers 4 and 5, all of the elements carried upon the shaft 11 must have a freely sliding fit upon the shaft. This includes the disc 1 and its bearing 24, and it must be pointed out that right here is one of the structures where the effects of transient load conditions can render a seemingly free slidable assembly totally ineffective and temporarily suspend the automatic operation of the mechanism regulating the contact pressure between the discs and the rollers, thus causing malfunction of the entire transmission. This will be more fully explained in connection with FIGS. 6, 7, 8 and 13.

Referring again to FIG. 2, it is seen that the lever 42 extends to both sides and makes contact near each end with a roller 50 which is rotatable and slidable upon a bar 52. Each bar 52 is held rigidly in the housing 23, as seen in FIG. 1, and there is one bar on each side of the housing, as shown in FIG. 2. Each of the rollers 50 has two shoulders 51—51 which straddle the sides of the lever plate 42, as can be seen in FIG. 1. Therefore, whenever the two rollers 50—50 are moved axially upon the bars 52, they cause an axial force to be applied against the one or the other side of the lever plate 42, which, in turn, will press against the shaft 11 from the left or the right side, as shown in FIG. 1 at 42–C.

The shaft 11 through the hub 20 forms part of the spider 11–12–13 and tends to move the entire spider assembly axially. When the rollers 4 and 5 are at standstill, the axial motion of the discs 1–2–3 cannot take place, because the discs are in frictional binding contact with the stationary rollers 4 and 5. However, when the rollers are rotating the discs can be moved axially at a moderate rate of speed because the rolling contacts 14, 17 for disc 1, 15, 18 for disc 2 and 16, 19 for disc 3, are then free to roll in a spiralling path inwards towards the center of the disc or outwards towards the periphery, as the case may be.

Referring again to FIG. 2, there is a sliding bridge 53—53 gliding upon the bars 52, 52 and holding the two rollers, 50, 50 between their end faces, as seen in FIG. 1. The two end plates forming the bridge are connected by the two lugs 55, 55 as seen in FIG. 2. These lugs 55 have been left out of the FIG. 1 for sake of clarity.

The sliding bridge is cradled between the two fingers 54, 54 (FIG. 1) of a member 56 which is mounted upon a screw spindle 57 so that it can be moved axially by rotating the screw 57. The screw spindle is journalled at both ends in the transmission cover 62. It can be rotated by the knob 59 and it is held against axial motion by the collar 60 and lock nuts 61 and on the other end by the shoulder 58. Turning the knob 59 in a clockwise direction (as seen from the right) will move the member 56 towards the right (provided that 57 is a right hand thread), and therefore, while the shafts and the rollers 4, 5 are rotating, move the floating spider 11–12–13–20 together with the discs 1, 2, 3 towards the right, thereby increasing the speed of the output shaft 22, and vice versa.

Transmission of power, or of torque from shaft 21 to shaft 22 can take place only if the pressure upon the rolling contacts, taken at right angles to the contacting surfaces, is sufficiently great to prevent slippage at the contact points. As has been mentioned above, an initial amount of contact pressure is supplied by the springs 47 which pushes the elements 43, 42, 41, 35, 31 and the disc 1 downwards, while its reaction pulls the shaft 11, and thereby also the hub 20, the shafts 12 and 13, and with these also the two discs 2 and 3 upwards. A certain minimum amount of torque can be transmitted with this contact pressure between the discs and the rollers 4 and 5. When a greater torque is to be transmitted, the required increase in contact pressure is supplied by the automatic system which comprises the elements 41, 42, 43, and the two rollers 50 upon the bars 52. The operation of this system will be briefly explained on hand of the FIG. 2 and more fully described on hand of FIG. 3. Referring to FIG. 2, if the input shaft 21 is turned clockwise and a resisting torque is applied to shaft 22, the spider with the discs 1, 2 and 3 will tend to rotate clockwise. This movement is stopped by the left end of the lever plate 42 bearing against the roller 50 at the point 42–L.

In a theoretical case where it is postulated that there are no deflections due to loads and where no play exists between adjacent pieces, there would be no rotation of the spider despite the fact that it is free floating upon the two roller tracks 8 and 9, because the roller 50 touching the lever plate 42 in the point 42–L would stop any motion of 42 and thereby of the shaft 11 of the spider. In a practical case however, there are slight deflections in the contact points of the rollers 4 and 5 with the discs, there are deflections of the discs under the bending stress, and small amounts of compression of the ball-thrust bearings as well as a small amount of elongation of the shafts 11, 12, and 13 under tension. The sum of these deflections causes an increase of the distance between the element 41 and 43 which is taken up by a tilting or rocking motion of the lever plate 42 about the ridge 45 of the wedge plate 41; the relative motion between the lever plate and the shaft 11 is a counter-clockwise turning of the lever plate 42, whereby it will lift the edge 49 of the wedge member 43 while pressing downwards upon the edge 45. Since the torque acting upon the spider tends to turn it clockwise, it will do so until the relative inclination of the lever plate with respect to the wedge members 41 and 43 is large enough to cause a lift of 49 relative to 45 which is equivalent to the total amount of deflections produced by the increased contact pressure, as above explained. In the case illustrated, the spider with the shaft 11 will swing to the right, by an angle alpha, until it reaches the new position indicated in dotted lines and denoted A–2. The original, central position of no-load is marked A–1.

Referring now to FIG. 3 there are schematically illustrated all essential parts of the transmission system, and marked with the same reference numbers as the corresponding parts of FIG. 2. The spider with its three shafts 11, 12, and 13 are denoted by heavy full lines, and on each of these the directions of the contact pressure between the discs and the roller track 8 are denoted as $q_1$, $q_2$, $q_3$. It is to be noted that there are here two projections falling one on top of the other: the three arms of the spider, 11, 12, 13 with their central intersection point Z are positioned in a plane through the centers of the three discs, while the contact points between the three discs with the roller circumference 8, numbered 14, 15, 16 respectively, are positioned in a plane through the largest circumference, or track, of the roller denoted as 8, see FIG. 1. The contact loads $q_1$, $q_2$, $q_3$ are also located in the plane of the track 8 and are therefore to be thought as in front of the paper surface by the same distance as 8 is shown from the center line of 20 in FIG. 1. The traction forces in the points 14, 15, 16, which determine the torque transmitted between the track 8 and the three discs, are denoted as $F_{14}$, $F_{15}$, $F_{16}$ and are also located within the plane of the track 8. A similar track, denoted 9, and having contact points with the discs 1, 2, 3, is to be thought below the plane of the paper spaced therefrom the same distance as track 9 appears to the left of the center line of 20 in FIG. 1. The contact points of the track 9 with the discs are denoted 17, 18, 19, respectively and there are traction forces denoted $F_{17}$, $F_{18}$, $F_{19}$ positioned in the plane of the track 9 and pointing to the same side as the traction forces of track 8. There is also a set of three radially inward directed forces within the plane of track 9, denoted $q_{1a}$, $q_{2a}$, $q_{3a}$, representing the contact pressures in the three points.

It is postulated that the track 8 is driven counterclockwise (as seen in FIG. 1) by a torque $T_1$. The free floating spider 11, 12, 13, with the discs 1, 2, 3, has then a tendency to rotate counterclockwise. This is prevented by the right arm of the lever plate 42 abutting against the roller 50 at 42–R. Due to the fact that element 50 is a roller, any force transmitted to it or by it must have a direction through its center of rotation. The direction of the force P is therefore perpendicular to the surface of 42, or parallel to the axis of 11. The size of P is such that the product of P times its distances $y$ from axis 11 is equal to the torque tending to rotate the spider, that is, the sum of the torques transmitted by track 8 (or input shaft) and track 9 (or output shaft). With the end 42–R being pushed down, the lever 42 has its fulcrum at 45 and lifts the other end at 48 with a force equivalent to P multiplied by the ratio $y/z$. If this force pushing 48 upwards is denoted Q, then the force acting at the fulcrum 45, pushing it downwards is Q plus P. If the direction of the torque $T_1$ should be reversed so that it is clockwise, the force P would appear at the point 42–L and the lifting force Q at the edge 49, the fulcrum 45 remaining the same. It is noted that the force pushing downwards upon disc 1 is not the same as the force pulling up on the shaft 11 and thereby on the two discs 2 and 3. The force pushing downwards upon disc 1 is greater by the force P. This difference between the forces acting downwards and upwards is taken up by the bearings of the shafts 21 and 22, FIG. 1, and cause the contact pressure between the disc 1 and the rollers 4 and 5 to be slightly higher than the pressure in the contacts of these rollers with the two other discs, 2 and 3 respectively. There is a definite advantage in this arrangement because it assures to the disc which is directly connected to the pressure control system an additional safety margin of contact pressure.

The axial pressure required at the center of each of the discs 1, 2, 3, is of course the sum of the contact pressures $q_1$ plus $q_{1a}$, $q_2$ plus $q_{2a}$, and $q_3$ plus $q_{3a}$ respectively, where the individual pressures $q_1$, $q_{1a}$ are determined by the torque $T_1$ to be transmitted and the diameter $d$ of the roller track 8 or 9. The force P acting upon the lever 42 determines the total force Q produced by the lever, as does the lever ratio $y/z$. It has been found however that in a structure as shown in FIG. 3 (and 2, 1) the distance $y$ is not a critical dimension, as long as the ratio of the track diameter $d$ to the width $z$ of the gap 42–C to 48 remains within a specified range, which depends upon the coefficient of traction applicable to the rollers and discs. The ratio between the gap $z$ and the diameter $d$ can then be written as $$\frac{z}{d} = k \cdot C_t$$

where $C_t$ is the coefficient of traction, which for rollers and discs made of hardened steel running with a lubricating oil will be found to be between .03 and .07; $k$ is a factor between 1.25 and 1.55, depending on surface finish, so that the critical value for the ratio $z/d$ is substantially between .0375 and .1085, based on a coefficient of traction between .03 and .07.

Selecting the ratio $z/d$ within this range will assure reliable and efficient operation for a transmission which is based upon the new principle embodied in the floating spider illustrated in FIGS. 1 and 2, and which also incorporates further structural innovations hereinafter described in detail.

The essential advantages of the floating spider design as above described and the ensuing basic differences in transmission performance when compared with previous systems shall here be briefly described. The new transmission will operate with the same degree of efficiency and reliability under conditions of static or slow changing load as well as under dynamic conditions of transient loads, in contrast to previous systems which fail under transient loads unless they are operated continuously under a pre-load well above their normal load, thus causing continuous great heat losses and a shortening of the life time to a fraction of its rated value.

The main reason for this difference of performance is to be found in the response time of the pressure control system to transient load conditions. Under load conditions that are static or gradually changing, the increase in contact pressure coincides with the increase in applied power or torque at the contact point (correctly, the contact is always a small area, not a mathematical point). However, under conditions of fast changing transient loads, it may happen—unless certain counter measures are provided—that the increased tractive force is applied to the contact point before the corresponding pressure increase takes place.

If this happens, the transmission fails through slippage between the contacting surfaces of the rollers and discs respectively. Due to the very high specific pressures in the contact points, the energy liberated by slippage in this small area develops enough heat to cause destruction of the smooth surfaces by fusion or galling.

The automatic pressure control system is actuated by a transmitted torque, and therefore, its response to transient torsional loads, particularly the time for transmission of a transient torque through the system, is determined by the entire system's natural frequency of torsional vibration. On the other hand, the response of the transmission to transients of pressure acting perpendicular to contacting surfaces is determined by the natural frequency of the system with respect to linear vibration.

In the transmission type herein referred to, the transient torque change must pass at least one rolling contact before it can reach the pressure control system, and the safety margin of traction in the contact must cover the differential of transmitted force during the response time of the pressure control system. Therefore, the lower the natural torsional frequency of the pressure control system, the greater the force differential building up at the contact points during the response time. The natural torsional frequency of the entire system included between input and output shaft depends on its polar inertia $J$ (lbs. in.$^2$) and its rotational compliance $C_R$ (torsional deflection in Rad. per lb. in applied torque). The reciprocal of $C_R$ is the rotational spring constant $K_R$ and the natural frequency is then $$f_n = \frac{1}{2\pi} \cdot \sqrt{\frac{K_R}{J}} \frac{\text{cycle}}{\text{sec.}}$$

It is apparent that the ratio of $K_R/J$ is the important factor which will determine whether the response time of a transmission system will be short enough to meet the requirements of transient load conditions as heretofore explained.

Applying the above formula to a transmission of previous design previously mentioned, with the same size rollers and discs, it is found that the ratio $K_R/J$ lies between about 1000/1 and 3000/1. In contrast hereto, the value of this ratio for the new structure is between about 200,000/1 and 600,000/1.

This gives the old design a frequency of about 5 to 8.5 cycles as against 72 to 130 cycles for the new structure. Considering as an example two transmissions with equal disc diameters of 3″, the old design shows a $J$ of $6.65 \cdot 10^{-2}$ lbs. in.$^2$ against $0.66 \cdot 10^{-2}$ lbs. in.$^2$ for the new; the spring constant $K_R$ for the old system is about 70 lbs. in./Radian while the new structure has about 4350 lbs. in./Radian. It is obvious that such radical changes of functional properties of a transmission system are possible only through the application of a basically new concept: The floating spider combines a minimum of mass and radius of gyration (about equal to radius of disc centers) with a maximum of stiffness against deflection (high spring constant) due in part to the prevalence of tensional stressed elements in the structure.

As before mentioned, the transmission illustrated in FIGS. 1 and 2 incorporates several other structures which contribute substantially to the reliability of performance under transient load conditions and particularly during overloads.

These structures were developed as an answer to several detrimental effects encountered while investigating transmission performance under conditions of dynamic loads and due to the varying appearances of these effects their nature and origin were at first not clearly understood. The several forms under which these effects may appear seem at first unrelated to each other. They have one common feature, that is, that at light loads they are very small or even non-existent, but with increasing load they grow at a much faster rate than the load to such a degree that they cause malfunction and even complete failure of the transmission system. One of these effects was observed with reference to the operation of the automatic pressure control system. When operated by an external force P applied to the end 42–R of the lever plate 42 (see FIG. 3), the system showed the required fast response, even under simulated over-load conditions; it also showed the fast response when operated under light loads to the complete transmission system, but with increasing transient load changes, the response became progressively more and more sluggish, although the natural frequency was not materially altered. The control system appeared as if bogging down gradually until it failed to maintain the required contact pressure, thus causing complete failure of power transmission between the two shafts.

In another form, the adverse effects would appear as an increased resistance against the force applied to operate the ratio control. At light loads a relatively small force would be required for shifting the discs relative to the rollers, but with increasing load, the force required for shifting would increase much faster than the load increased and in addition thereto, the size of the shifting force would depend on the direction of the shift, that is, it would be greater when shifting towards higher speed of the output shaft and lower when shifting towards lower output speeds.

In some cases the transmission showed a marked tendency to shift itself towards higher or lower ratios with increasing or decreasing load and this unexpected feedback caused severe disturbances in automated speed control systems.

Through extensive experiments I found that all of these effects have one common cause which will now be explained on hand of FIGS. 6, 7, 8 and 13.

For the purpose of clarity, a simplified structure comprising only one disc and two rollers will be considered at first. FIG. 6 shows two rollers 8 and 9 in axial alignment with each other and in rolling contact with the disc 1. The common geometric axis of the rollers intersects the geometric axis of the disc; as a result of this, the contact points between the rollers and the disc are located upon one diameter X—X of the disc and at opposite sides thereof with respect to the disc center O. Postulating that the roller 8 is driven clockwise and pressed against the disc 1 by a force $q_1$ which is perpendicular to the disc surface at the contact point, we find a traction force $F_1$ acting upon the disc in the contact point; the direction of this traction force is perpendicular to the diameter X—X through the contact point 14. If the disc is allowed to rotate under the influence of the force $F_1$, it rotates clockwise and drives the roller 9 to rotate counter-clockwise. If a resisting torque (a brake torque) is applied to the shaft of roller 9, a resisting traction force appears at the contact point 17. In the case that the contact points 14 and 17 have the same distance from the disc center O, the traction forces in the two points, $F_1$ and $F_2$ respectively, are equal in size and parallel to each other. Both lie in the plane which coincides with the disc surface. The action of these two forces upon the disc 1 can be represented by the action of a single force $F_1+F_2$ parallel to the forces $F_1$ and $F_2$ and going through the center O of the disc 1.

Referring now to FIG. 7 there is shown the roller 8 as seen from the right side of FIG. 6 in the direction of the axis K—K and the surface of the disc 1 appears as a straight line S. The resultant force $F_1+F_2$ appears as a straight line beginning at the center and lying in the plane of the surface S, pointing to the left. With respect to the forces $F_1$ and $F_2$ and the resultant therefrom, the disc 1 is supported by a ball bearing 24-B positioned in the bore of the disc 1. The actual point of support of the disc 1 with respect to a lateral force is therefore between the upper surface S and the lower surface of the disc 1, and is the point of contact of the bearing balls with either of the bearing races, due to the fact that there is always a slight sideways play in a ball bearing unless it be preloaded. The reaction to the lateral force $F_1+F_2$ goes through this point of support and is opposite to the original force. These two forces which are spaced from each other by the distance $g$ act upon the disc 1 like a torque $(F_1+F_2) \cdot g$ and tend to tilt the disc in the direction of the arrow U. Unless this torque is resisted by another of equal size and opposite direction, the disc will actually tilt in the direction of the arrow U, that is in a sense of rotation which is opposite to that of the driving torque $T_1$ and of the sense of rotation of the roller 8. In other words, the disc according to this reasoning, is expected to tilt, or climb up against the driving force of the roller. While this may seem at first unexpected, this tilting of the disc is exactly what happens in a transmission under heavy transient loads. The discs taken on a position schematically illustrated in FIG. 8 where the disc 1 is tilted into the positon 1' and the contact point between roller 8 and disc surface moves from position 14 to the position 14', being displaced laterally against the action of the tractive force by the linear amount $h$. The tilting of the disc 1 also changes the distribution of the forces in the supporting thrust bearing which oppose the contact pressure $q_1$, and the displacement of these forces as well as of the contact pressure $q_1$ produces a torque opposed to that which causes the disc to tilt. In actual tests, it has been observed that the discs were tilted at angles delta of ½ to 1°, which was sufficient to make the discs come in contact with each other at the points 101, 102, and 103 in FIG. 2 and inflict surface damage by friction upon each other, although the distance or clearance at these points under light load or no load was of the order of 0.020 to 0.030 inch, the disc diameter being 3″.

All of the detrimental effects previously mentioned can now be explained and the means for their elimination can be described. The first adverse effect was the bogging-down of the pressure control system under heavy loads suddenly applied. This was caused by the disc bearings having not enough clearance upon the spider shafts to permit the disc to tilt freely; the disc tilt caused the tilted inner race to bite into the shaft and create a friction force preventing a free sliding motion of the disc 1 upon the spider shaft 11 in response to the action of the lever plate 42 between the wedge members 41 and 43. It was observed that this motion was "sticky" when under heavy load, first lagging behind a load increase and then overshooting it. Giving the disc sufficient clearance upon the spider shaft 11 restored the responsiveness of the pressure control system to transient loads, but it also increased the second and third adverse effect mentioned.

This shall now be explained on hand of FIG. 13. While the first mentioned effect, the sluggishness or choking off of the pressure control system is observed only on the disc 1, which is the disc directly actuated by the pressure control system, the second and third effect concern equally all three discs. It is therefore illustrated schematically on disc 3 shown in FIG. 13. This represents the disc as it will appear when looking at it from an extension of the geometrical axis of the shaft 13 to the upper left, with a direction of sight opposite the direction of the arrow $q_3$ in FIG. 3. The direction of rotation of the roller 8 which contacts the disc in the point 16 is supposed to be clockwise as seen from the right end of the axis X—X. This drives the disc in a clockwise direction W, FIG. 13, the contact point of the roller 9 is at 19 for no-load condition. The tractive force transmitted in 16 is coincident in its direction with the surface speed in that point, which is marked $V_{16}$. Similarly, the surface speed of the contact point 19 is marked $V_{19}$. The track of the contact points 16 and 19 upon the disc 3 is the circle M. The tractive forces acting in the contact points have not been shown in order to avoid crowding and confusion. Their relative position and size can be easily seen from a comparison of FIG. 13 and FIG. 6.

When according to FIGS. 7 and 8, the disc 3 is now tilted against the sense of rotation, and the contact point 16 moves to 16' in a direction opposing the tractive force in the point 16, it is seen that the new contact point 16' is positioned on a circle larger than the old track M. If the radius of the track through point 16 was R, and the lateral displacement of the contact point is $h$ (see also FIG. 8) then the new radius R' is found as $$R' = R \frac{L}{\cos \theta}$$

where $$\tan \theta = \frac{h}{R}$$

The tangential (or peripheral) speed of the roller 8 at the contact point 16' is still of the same size as before, denoted VT–16', while the tangential speed of the disc in that same point is V–16', forming the angle $\theta$ with the direction of the tangential roller speed VT–16'. It is seen that the disc speed V–16' is greater than the roller speed VT–16', which is identical with V–16. Since however the track circle N is also greater than the track circle M, the angular velocity of the disc 3 has not changed; the ratio of V–16' to VT–16' being the same as R' to R, or the reciprocal of the cosin of the angle $\theta$. It is also apparent that the tangential speed V–16' has a component VA–16' which tends to move the contact point 16' axially to the right, since the roller 8 has no surface speed lateral of its plane of rotation. The component VA–16' therefore causes a sliding motion between the disc and the roller if the roller is free to follow the friction force in the direction VA–16'. It is seen that this force would move the roller 8 to the right, or, if the disc is movable relative to the roller, the disc will be moved to the left. This increases the radius of the contact point in proportion to the movement of the disc center to the left, and as a last consequence, reduces the speed of the disc and of the output shaft. The transmission has a tendency to shift towards lower output speed as a reaction to any load that is great enough to cause a tilting of the discs.

This tilting together with the adverse effects thereof can be eliminated by reducing the tilting torque, which is of the size $(F_1+F_2) \cdot g$, to zero. This I accomplish by placing the lateral support of the disc in the same plane with the traction forces $F_1$ and $F_2$; the factor $g$ of the tilting torque is thereby reduced to zero. FIG. 9 illustrates one way in which this may be carried out. The ball bearing 26-B′ is so positioned that the contact of the balls with the races, which usually lies at the center of the race, is substantially within the plane of the surface 203. Due to the fact that radial ball bearings, except pre-loaded types, have a small amount of clearance between the balls and the races, the outer race can swivel against the inner race by a small angle; however, no tilting of the discs about the geometrical axis through the contact points takes place because the tilting torque has been reduced to zero.

Instead of using the structure as shown in FIG. 9, it may in certain cases be preferable to employ the structure illustrated in FIGS. 1, 2, 11, and 12. FIG. 1 shows the disc 1 and 3 in section so that the mode of support can be easily seen. The disc 1 is provided with a small roller or needle bearing 24 which runs directly upon the shaft 11, and the needle bearing is so positioned that it extends slightly beyond the edge 27 of the disc 1, so that the factor $g$ is substantially zero. In FIG. 2 it is seen that the disc 3 has a similar support and the disc 2 is understood to be of the same construction. According to the disclosure of FIG. 7, the tilting torque becomes zero when the factor $g$ is made zero.

A further inspection of FIG. 7 also discloses that the factor $g$ may be so changed that it becomes negative. The support point against lateral forces is then positioned above the disc surface S (FIG. 7); the tilting torque is then also negative, that is, tending to tilt the disc in a direction opposite to the arrow U. From an inspection of FIG. 13 it is seen that the factor $h$ is then also negative, that is, below the axis X—X, and the shifted contact points (not shown for a negative $h$) would also be below the axis X—X. A speed diagram for a contact point 16 in a shifted position below the axis X—X would be similar to the diagram shown for the contact point 19 as shifted to 19′, if that entire diagram is swung around the center O until it is located in the lower right hand quadrant. It is then seen that the lateral or axial speed component VA-19′ would be pointing to the left. This means that the lateral force between the roller 8, original contact point 16, and the disc will tend to move the roller to the left, closer to the disc center; or, conversely, move the disc to the right of the roller, which has the same effect of bringing that roller contact closer to the disc center. This means that the disc is driven at a greater speed and this is also transmitted to the output shaft. Therefore summarizing we find that with a positive $g$, the transmission tends to shift towards slower output speed, and with a negative $g$ it tends to shift towards a higher output speed.

In a transmission where the discs are supported so that no tilting will occur under load, as illustrated and described in FIGS. 1 and 2, there appears no force tending to displace the rollers laterally with respect to the discs and therefore the force required for changing the transmission ratio is substantially independent of the load transmitted; thus the second and third form of the adverse effects as previously described are eliminated.

The transmission illustrated in FIG. 1 shows the tracks 8 and 9 of the rollers 4 and 5 positioned at the same distance from the disc center. The schematical FIGS. 6, 7, 8 and 13 are likewise based upon the postulate that the tractive contacts of the two rollers respectively are at the same distance from the disc center. Under these conditions, the tractive forces transmitted in the contact points at opposite sides of the disc center are of equal size, and consequently the contact pressures should also be of equal size. The total pressure applied to the disc center is obviously distributed in equal parts to the two contact points.

If the transmission ratio is changed, each contact point must receive enough contact pressure to transmit the peripheral force corresponding to the track radius of the disc at this point. This required contact pressure will vary in inverse proportion to the track radius at the particular contact point. The distribution of the total contact pressure as between the two contact points must reliably follow the inverse proportion of the respective radii of the contact points upon the disc surface.

This is shown schematically in FIG. 9. If the distances from the center, or radii of the contact points, 16 and 19 respectively, are $a$ and $b$ respectively, and the roller 8 having the radius $r$ is driven by the torque $T_1$, the contact pressure required to transmit this torque at the point 16 is $$q_1 = \frac{T_1}{r \cdot C_t} = T_1 \cdot \frac{1}{r \cdot C_t}$$

where $C_t$ is the coefficient of traction.

The torque received by the disc is $$T_1' = T_1 \cdot \frac{a}{r}$$

In order to transmit this torque to the other roller in the point 19 there is required a pressure $$q_2 = T_1' \cdot \frac{1}{b \cdot C_t} = T_1 \cdot \frac{a}{r \cdot b \cdot C_t}$$

Since $$T_1 \frac{1}{r \cdot C_t} = q_1$$

therefore $$q_2 = q_1 \cdot \frac{a}{b}$$

or $$q_2 \cdot b = q_1 \cdot a$$

The distrbution of pressure according to this proportion is obtained if the combined contact pressure $$Q = q_1 + q_2$$

is applied precisely through the center of the disc which must be free to balance about its center. This theoretical requirement indicated in FIG. 9 by showing the central pressure Q applied through the wedge 140 which acts as a fulcrum for the disc acting as a balance beam between the points 16 and 19. In structures where the total deflection is limited substantially to the elastic deformations in the contact points, the rocking motion of the disc required to balance the pressures at the two contact points is very small and the play obtained from conventional ball bearings may be more than sufficient to cover this motion. However, where the discs employed have thin cross sections, which may be required for the purpose to reduce inertia, the disc will show a noticeable deflection somewhat similar to a beam supported at two points (the contact points) and loaded at its center in a small area; in such cases with the greater rocking motion required for the disc in order to reliably equalize the actions of the two contact pressures, it may be preferable to use a different structure as illustrated in FIG. 10, or a structure illustrated in FIGS. 11 and 12.

In FIG. 10 the disc 3 is supported transversely by the ball bearing 26-B and axially by the thrust bearing 33-37. This in turn is supported by the abutment 39′. A pivot pin, 40, holds the abutment 39′ in a fixed position with respect to the shaft 13 of the central hub 20. The abutment 39′ is however free to perform an oscillating motion of a few degrees about the pivot 40. Since the disc 3 has a limited freedom of swivel about the bearing 26-B, it can perform a limited motion to balance the forces. Due to the fact that the disc 3 and the ball bearing race swing about different centers, there exists a small lateral motion between the races above and below the balls 33 which limit the factor of conformity applicable to the thrust bearing.

This limitation is avoided in the structure illustrated in FIGS. 11 and 12. The disc 3 is rotatable by a needle or roller bearing which does not have to allow any swivel motion. The abutment 39 of the thrust bearing 33–37 is locked upon the shaft 13 by the pin 40, and can neither move nor swivel or rock. This is also seen in FIG. 12. It is noted that the bearing 26 is so positioned that it protrudes from the surface 103 of the disc 3. The disc 3 can not for all practical purposes perform a rocking or swivel motion of sufficient magnitude to achieve balancing of the contact pressures. The distribution of the total pressure so as to reliably maintain the condition $$a.q_1 = b.q_2$$

is obtained by making at least one of the shafts flexible so that its geometrical axis may swing in a plane through the transmission axis and the contact points of the disc. In FIGS. 11 and 12, the shaft 13 is thinned out in a zone adjacent to the bearing 26. The circular cross section of the shaft is reduced to a narrow rectangular section 93 for a limited length, with the long sides of the rectangle being parallel to the planes of rotation of the rollers, or in other words perpendicular to the axis of the transmission. For the purposes of equalisation of pressure between the contact points of the rollers 8 and 9 with all three discs, it is sufficient to provide only one of the shafts of the spider with the elastic zone as above described.

The free floating spider can then be constructed as one hub with three radial arms, one of which has a flexible portion permitting it to perform a limited motion where its geometrical axis is confined to a plane which is perpendicular to the plane which contains the two other geometric axes of the other shafts.

It will be understood that the disclosures herein of the various aspects of my invention are by way of illustration only and that the principles involved may be reduced to practice in other specific embodiments within the spirit and scope of the invention and that it is not intended to limit the invention in any other way than as defined in the appended claims.

What I claim as new and desire to secure by Letters Patent is:

1. A variable speed transmission, comprising two shafts aligned on a common geometrical axis, a roller on each shaft, three discs having their axes of rotation intersecting each other in one point located substantially upon said common axis, each of said discs having a plane surface positioned at an angle of substantially 60° with respect to the plane surfaces of the other discs and facing inwardly towards said common axis each plane surface being in contact with both of said rollers, each of said discs having at its center a bore and a thrust bearing comprising a thrust race outwardly adjacent said disc and concentric with said bore, a free floating member having a central portion coaxially positioned in the space between said two rollers and the inward surfaces of said discs, said central portion being provided with three radial arms extending outwardly therefrom through the bores at the centers of said discs and through the said thrust races, an abutment means upon each of said radial arms adjacent each of said thrust bearings and adjustable radially inwards for generating in each of said arms forces of radial tension whereby each of said discs through its respective thrust bearing is pressed into frictional driving contact with said two rollers, said radial arms and said central portion of said floating member being so constructed and associated with said arms that said forces of radial tension are transmitted through said arms to said central portion and equalized thereby, pressure means upon at least one of said arms adapted to increase the contact pressure between said discs and rollers, said pressure means comprising an element pivotally connected to said arm, an axially slidable control means including abutments engaging said element and constructed to prevent free rotational motion of said free floating member and said radial arms about said common axis while providing for free lateral adjustability of said member with respect to said common axis.

2. A variable speed transmission system, comprising a pair of coaxially aligned shafts, a roller on each shaft, said rollers having convex profiles on their peripheries, three discs having a plane inner surface each and having their respective rotational axes substantially in one plane at right angles to the geometrical axis of said rollers, the rotational axes of said discs forming angles of substantially 120° with each other, a free floating hub coaxially aligned with said shafts and having three radial shafts equally spaced from each other and extending from said hub radially outwards through the centers of said discs respectively, bearing means for journalling each of said discs upon its radial shaft, said bearing means being adapted to take up radial and axial forces with respect to each individual shaft so as to maintain the inner surface of each of said discs in driving contact with the periphery of each of said rollers, means for pressing at least one of said discs radially inwards to increase the contact pressure of all of the driving contacts, whereby increased tractive forces in a direction tangent to the periphery of said rollers and parallel to said inner surface of said discs are transmitted by each of said driving contacts, said hub with its radial shafts being free to move in any direction laterally with respect to the common axis of said rollers to provide automatic equalization of the pressures in the three driving contacts of either of said rollers, said bearing means being so constructed and associated with said discs and said radial arms that any tilting of the inner surfaces of said discs under the influence of said tractive forces is prevented, means provided to limit the free rotation of said hub about said common axis while allowing full freedom of the lateral movement of said hub relative to said axis, and externally controlled means for causing axial movement of said hub with its radial shafts relative to said rollers to vary the speed ratio of said transmission system.

3. In a transmission of the kind referred to, in combination with a pair of coaxially aligned rollers in driving contact with three surrounding discs freely rotatable upon radial and thrust bearings, a carrier for said discs connected thereto only through said bearings so as to be free floating and capable to equalize the forces of said bearings by small lateral movements, said carrier comprising a central portion positioned between said rollers and coaxially aligned therewith, three shafts radially extending from said central portion and connected thereto so that substantially tensional forces only are transmitted between said central portion and said shafts whereby heavy deflections of the carrier due to flexural stresses are prevented.

4. In a transmission of the kind referred to, in combination with coaxial driving and driven rollers surrounded by three discs and in power transmitting rolling contact therewith, a free floating spider having a central portion coaxially positioned between said rollers and said discs, said spider having three arms extending therefrom radially outwards and provided with bearings for rotatably carrying said three discs, equalizing the radial forces between said discs and said rollers by small motions of said spider laterally with respect to the geometrical axis of said driving and driven rollers, and means carried by one of said radial arms constructed to limit the coaxial rotation of said spider without restricting its free floating lateral movements whereby the radial forces between said discs and said rollers are equalized.

5. In a transmission of the kind referred to, the combination of a pair of axially aligned rollers engaging in driving contact with a plurality of freely rotatable discs which tangentially surround said rollers, a carrier for said discs constructed to deliver to each of said discs the amount of pressure required to render said driving contacts effective to transmit torque between said discs and said rollers, said carrier comprising means responsive to the sum of all tractive forces in said driving contacts and adapted to increase the pressure upon said driving contacts in an unlimited straight proportionality to said sum of tractive forces, and said carrier having a radius of gyration substantially not greater than the radius of gyration of said discs with respect to the geometrical axis of said aligned rollers.

6. In a transmission of the kind referred to, a pair of coaxially aligned rollers and a plurality of discs each having flat inner surfaces parallel to the geometrical axis of said rollers and in driving contact with said rollers for transmitting power through tractive forces which for each of said discs are co-planar with said flat surface, a carrier for said discs having radial shafts and upon each shaft a bearing supporting each individual disc for loads in radial direction relative to said shaft, said radial load bearing being mounted in said individual disc so that its zone of support of radial load is positioned substantially co-planar with the plane of said flat surface, of said individual disc.

7. In a transmission of the kind referred to, two coaxially aligned shafts, a roller on each shaft, three flat discs in driving contact with said rollers to transmit power from one to the other, a carrier for said discs having a central hub coaxially positioned between said rollers and said discs and extending therefrom three radial arms extending through the centers of said discs, bearing upon said arms for journalling said discs for radial and thrust loads, a pressure control system upon one of said arms constructed to transmit radially inwards to the adjacent thrust bearing a pressure modulated by the resultant of all torques transmitted by all of said discs to said carrier.

8. A transmission of the kind referred to, comprising axially aligned driving and driven rollers having identical diameters $d$ at their periphery, three flat discs in driving contact with the periphery of said rollers to transmit power from one to the other, a carrier for said discs having three radial arms with bearings for journalling said discs, one of said arms carrying a pressure control system adjacent said bearings for regulating the pressure between said discs and said rollers, said pressure control system including a substantially straight flat lever interposed between an inner and an outer wedge cam element, said inner element having a pivot edge parallel to the geometrical axis of said driving and driven roller and intersecting the geometrical axis of said arm, the said outer wedge cam having two pivot edges parallel to said first pivot edge and spaced symmetrically with respect to the geometrical axis of said arm by a distance of $2z$ from each other and with the ratio $z/d$ having a value between substantially 1.25 and 1.55 times the coefficient of traction between said discs and said rollers.

9. A variable speed transmission, comprising two axially aligned shafts, a roller on each shaft, three flat discs in driving contact with said rollers, each of said discs having a central bore a carrier for said discs having radial arms extending through the central bores of the discs, thrust bearings upon said arms for journalling said discs and pressing them radially inwards against said rollers, abutments for said thrust bearings mounted on said shafts, one of said abutments being constructed to allow a limited rocking motion about a geometrical axis at right angles to said arm and parallel to the plane of rotation of said rollers, while simultaneously preventing a tilting motion of the abutment in any other direction.

10. A variable speed transmission, comprising two axially aligned shafts, a roller on each shaft, three flat discs in driving contact with said rollers, said discs being provided with openings at their centers a carrier for said discs having a hub with three radial arms which extend through the central openings of the discs, bearings for radial loads and for thrust loads upon said arms for journalling said discs and for pressing them radially inwards against said rollers, abutments for said thrust bearings mounted on said shafts at their outer end, one of said radial shafts being provided with a flexible thinner zone located inside said bearing for radial loads adjacent said hub, said zone being constructed to render the outer portion of said arm flexible only in a plane at right angles to the plane determined by the two other arms.

11. A variable speed transmission comprising a housing, a pair of axially aligned shafts journalled in said housing, a roller on each shaft, three discs rotatable in planes substantially parallel to the common axis of said shafts and engaging in driving contacts with said rollers, a carrier for said discs having three radial shafts equally spaced, the geometrical axes of said radial shafts intersecting each other in one point, bearings for thrust loads on said shafts adjacent said discs, one of said bearings being slidable radially inwards upon said shaft for increasing the pressure in the said driving contacts, a pressure control system for automatically modulating the pressure between said discs and rollers in accordance with the requirements of the transmitted power, said system including a wedge cam adjacent said thrust bearing slidable upon said shaft and having a pivot edge intersecting the geometrical axis of said shaft and extending at both sides thereof substantially parallel to said common axis, a lever in the form of a substantially flat plate which is narrow in a direction parallel to the said common axis but extends to both sides of said arm for a distance about equal to the radius of the said discs, said plate having at its center a bore through which said arm passes with enough clearance to permit a limited rocking motion of the plate-lever with respect to the radial arm and to the wedge cam, an outer wedge cam carried by said arm having two pivot edges in contact with the outer flat surface of said lever, said pivot edges being parallel to said common axis and positioned spaced symmetrically with respect to the geometrical axis of said radial shaft, an abutment for said outer wedge cam adjustable longitudinally upon said radial arm, a ratio control member mounted axially slidable in said housing and constructed to engage said lever in two narrow zones of its outer surface near the ends of the lever to prevent rotation of said lever with the said carrier about the said common axis, said control member being also provided to engage said lever sideways to compel it to follow the axial control motions of the control member whereby the effective driving radius between said discs and rollers is altered to vary the transmission ratio.

12. A transmission of the kind referred to, comprising two rollers aligned upon a common geometrical axis, means to transmit a torque to each roller, a plurality of plane discs contacting the periphery of both rollers, a carrier for said discs including a spider with radial arms and bearings thereon for journalling said discs, means for controlling the pressure between said discs and said rollers in accordance with the requirements of the transmitted torque, said discs, said carrier and said pressure control means being so constructed that the ratio of the rotational spring contant of the entire system transmitting torque from one of said rollers to the other (lbs. in torque per Radian torsional deflection) to the polar inertia of said entire system (lbs. in.$^2$) is between 200,000 to 1 and 600,000 to 1.

13. In a tranmission of the kind referred to, the combination with a pair of coaxially aligned races of equal diameters, of a plurality of freely rotatable discs tangentially surrounding said races and in tractive rolling contact therewith, a free floating carrier coaxial with said races and having equally spaced radial arms with journalling means for supporting said freely rotatable discs, at least one of said journalling means being displaceable radially inwards to increase the pressure in said tractive rolling contacts, means for causing said displacement, said last named means being so constructed and associated with said carrier, said journaling means and said radial arms that the resultant forces of the contact pressures between each of said discs and said races are substantially balanced and equalized by forces of tensional stress within said radial arms and said carrier.

14. A variable ratio transmission comprising: an input shaft; an output shaft in axial alignment with said input shaft; a driving race mounted on said input shaft; a driven race mounted on said output shaft; said races being of equal diameters; a floating support freely displaceable to a limited extent in a plane perpendicular to the common axis of said shafts; said support having a plurality of equally angularly spaced radially extending shafts carried by said support; an intermediate coupling disc freely rotatable mounted on each of said radial shafts, each coupling disc simultaneously engaging said driving and driven race, one of said coupling discs being movable axially on its supporting radial shaft; ratio adjustment means for displacing said floating support along said common axis; pressure increasing means for acting simultaneously on said one of said coupling discs and its supporting radial shaft to force one disc towards said driving and driven races to increase its pressure of engagement therewith, the action of the reactive forces to said pressure increase causing through tensional forces in said radial shaft a corresponding increase in the pressure of engagement between all of the others of said coupling discs and said driving and driven races; and means engageable with said pressure increasing means and held against rotational movement around said common axis for increasing said pressures of engagement responsive to transient torque variations.

15. A transmission according to claim 14 wherein said coupling discs are three in number and the axes of said radial supporting shafts are spaced 120° apart.

References Cited by the Examiner

UNITED STATES PATENTS 2,057,482  10/1936  Erban _____ 74—196 X

FOREIGN PATENTS 244,419  9/1946  Switzerland.

MILTON KAUFMAN, *Primary Examiner.*

DON A. WAITE, *Examiner.*

T. W. SHEAR, *Assistant Examiner.*